US011345398B2

(12) United States Patent
Oetken

(10) Patent No.: US 11,345,398 B2
(45) Date of Patent: May 31, 2022

(54) MACHINE TURN RADIUS CONTROL BASED ON SLOPE

(71) Applicant: Caterpillar Paving Products Inc., Brooklyn Park, MN (US)

(72) Inventor: Nicholas A. Oetken, Brooklyn Park, MN (US)

(73) Assignee: Caterpillar Paving Product Inc., Brooklyn Park, MN (US)

( * ) Notice: Subject to any disclaimer, the term of this patent is extended or adjusted under 35 U.S.C. 154(b) by 403 days.

(21) Appl. No.: 16/160,694

(22) Filed: Oct. 15, 2018

(65) Prior Publication Data
US 2020/0114958 A1 Apr. 16, 2020

(51) Int. Cl.
B62D 6/00 (2006.01)
E02D 3/046 (2006.01)

(52) U.S. Cl.
CPC .............. B62D 6/001 (2013.01); E02D 3/046 (2013.01)

(58) Field of Classification Search
None
See application file for complete search history.

(56) References Cited

U.S. PATENT DOCUMENTS

| 5,489,006 | A | 2/1996 | Saiia et al. |
| 7,810,887 | B2 | 10/2010 | Hjerth et al. |
| 8,019,514 | B2 | 9/2011 | Yuet et al. |
| 8,818,699 | B2 | 8/2014 | Nichols et al. |
| 9,550,522 | B2 | 1/2017 | Oetken et al. |
| 9,952,115 | B2 | 4/2018 | Landes et al. |
| 10,392,007 | B1* | 8/2019 | Brown .................... G01C 21/18 |
| 2005/0087375 | A1* | 4/2005 | Steele ..................... B60L 15/20 180/65.1 |
| 2011/0199236 | A1* | 8/2011 | Hauber ................ B62D 15/027 340/932.2 |
| 2012/0109411 | A1* | 5/2012 | Tokimasa ............ B60W 10/184 701/1 |
| 2012/0159916 | A1* | 6/2012 | Ishii ........................ B60L 8/003 56/10.2 A |
| 2014/0196449 | A1* | 7/2014 | Petty ..................... F16H 61/421 60/487 |
| 2015/0025744 | A1* | 1/2015 | Banno ...................... B62D 6/04 701/41 |
| 2016/0057921 | A1* | 3/2016 | Pickett ................... G05D 1/021 701/41 |
| 2016/0318509 | A1* | 11/2016 | Rycroft ................. B60T 8/1755 |
| 2017/0247023 | A1* | 8/2017 | Owen ..................... B60T 8/171 |
| 2017/0361847 | A1* | 12/2017 | Marutani ............. B60W 10/119 |

(Continued)

FOREIGN PATENT DOCUMENTS

CN 103675320 8/2015

Primary Examiner — Krishnan Ramesh
(74) Attorney, Agent, or Firm — Schwegman, Lundberg & Woessner

(57) ABSTRACT

A machine that can comprise a steering system configured to direct movement of the machine and a control system operably coupled for communication with the steering system. The control system can comprise a grade sensor, and a controller configured to determine a slope from an uphill side of the machine to a downhill side of the machine based on sensed data from the grade sensor. The controller can be further configured to control the steering system to limit a turn radius of the machine toward the uphill side of the frame based on the determined slope.

13 Claims, 5 Drawing Sheets

(56) References Cited

U.S. PATENT DOCUMENTS

| | | | |
|---|---|---|---|
| 2018/0087242 A1* | 3/2018 | Mitchell | B62D 6/02 |
| 2018/0244257 A1* | 8/2018 | Kneitz | B60K 6/448 |
| 2019/0184989 A1* | 6/2019 | Matsumoto | G06K 9/00798 |
| 2019/0193787 A1* | 6/2019 | Matsumoto | B62D 6/00 |

* cited by examiner

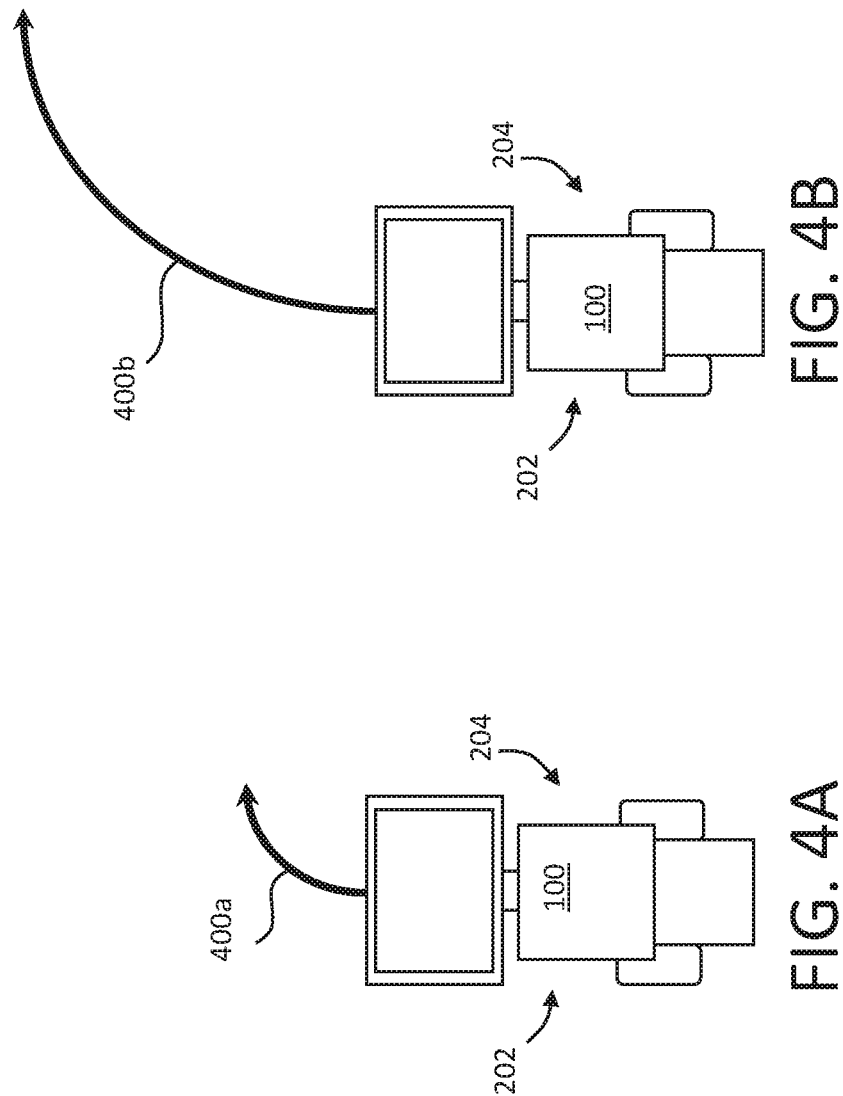

MACHINE TURN RADIUS CONTROL BASED ON SLOPE

TECHNICAL FIELD

The present application relates generally to steering control of working machines. More particularly, the present application relates to a system and method of controlling a turn radius of a working machine traversing a side slope.

BACKGROUND

Compactors and other construction machines are operated on a variety of terrain having varying levels of slope. While operating on a side slope, for example, the machine can tip over if steered at too narrow of a radius. This can be due to a center of gravity shift associated with articulated type machines, or lateral forces associated with all types of machines while turning. It is desirable to prevent tipping of construction machines when operating on sloped terrain.

SUMMARY OF THE INVENTION

In one example, a machine that can comprise a steering system configured to direct movement of the machine and a control system operably coupled for communication with the steering system. The control system can comprise a grade sensor, and a controller configured to determine a slope from an uphill side of the machine to a downhill side of the machine based on sensed data from the grade sensor. The controller can be further configured to control the steering system to limit a turn radius of the machine toward the uphill side of the frame based on the determined slope.

In another example, a method of controlling a working machine traversing a hill is disclosed. The method can comprise: determining, by the working machine, a slope of the hill from an uphill side of the working machine to a downhill side of the working machine; comparing, by a control system of the working machine, the slope to first threshold; and limiting, by the control system, an uphill turn radius of the working machine if the slope is greater than the first threshold.

In another example, a control system for a working machine is disclosed. The control system can comprise: a grade sensor configured to sense a value indicative of a slope of a hill upon which the working machine is traversing; a steering system configured to control a direction of movement of the working machine; and a controller configured to determine the slope of the hill based on input from the grade sensor and control the steering system to limit an uphill turn radius of the working machine based on the slope.

BRIEF DESCRIPTION OF THE DRAWINGS

FIGS. 4A and 4B are diagrams illustrating turn radii of a working machine.

DETAILED DESCRIPTION

Figure 1:
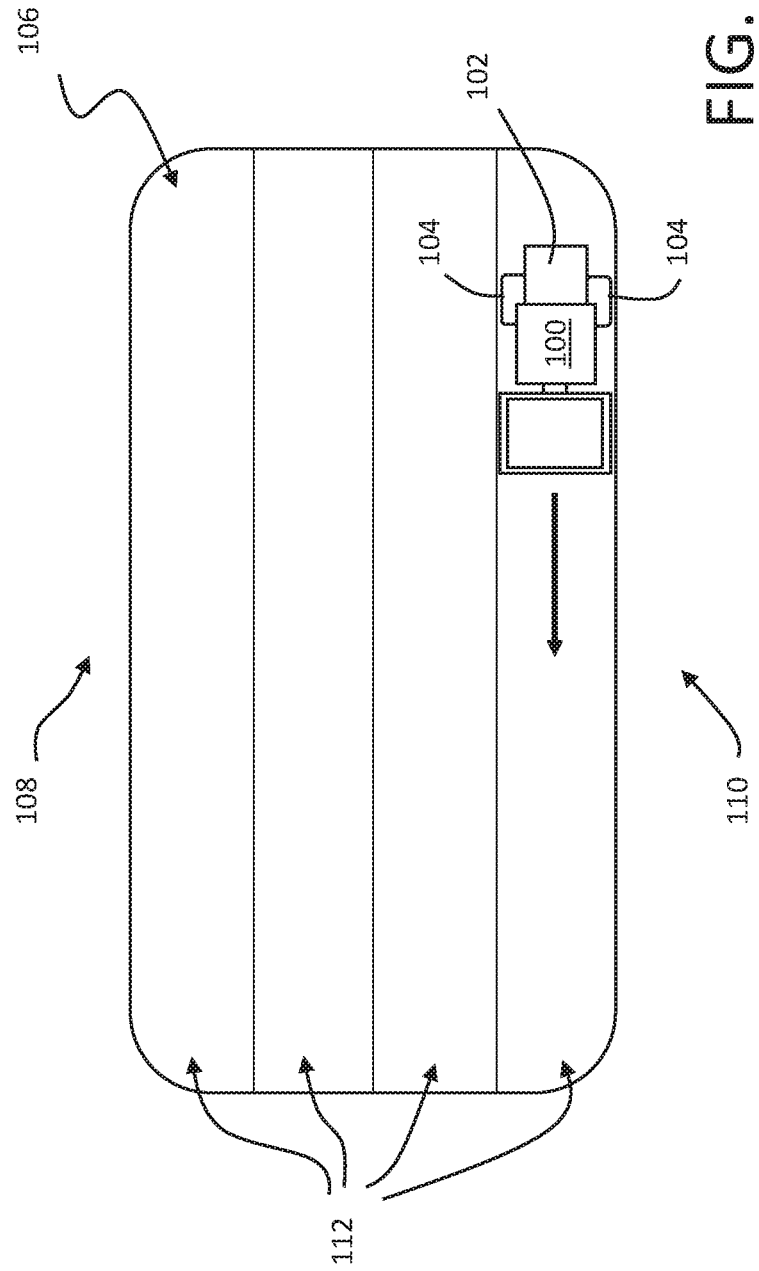
FIG. 1 is a top view of a working machine traversing a work area.

FIG. 1 is a top view illustrating a working machine 100 according to one example of the present disclosure. Machine 100 can be any construction, industrial or other light or heavy work machine, including, for example, a vibratory soil compactor. In other examples, however, the machine may be other types of machines related to various industries, including, as examples, construction, agriculture, forestry, transportation, material handling, waste management, and so on. Accordingly, although several examples are described with reference to a compactor, examples according to this disclosure are also applicable to other types of machines including graders, scrapers, dozers, excavators, material haulers, and other example machine types.

Machine 100 can include frame 102 mounted on wheels 104, frame 102 being configured to support and/or mount one or more components of machine 100. Machine 100 may be equipped with various systems and mechanisms for control of the operation and movement of machine 100 including, for example, a drive system, a steering system, and other control systems. These systems may be implemented in one or more on-board electronic devices including, for example, an electronic control unit (ECU). Machine 100 may be operated autonomously, by an operator, or by some combination of the two.

Machine 100 is configured to operate on work area 106. In many cases, work area 106 includes uneven and sloped terrain. In the example embodiment illustrated in FIG. 1, work area 106 is located on a hill having an uphill side 108 and a downhill side 110. Machine 100 traverses work area 106 along work paths 112, which are sloped from uphill side 108 to downhill side 110. To traverse all work paths 112, machine 100 must at times turn toward uphill side 108. If the slope of the hill from uphill side 108 to downhill side 110 is great enough, there is a risk of machine 100 tipping during uphill turns.

Figure 2:
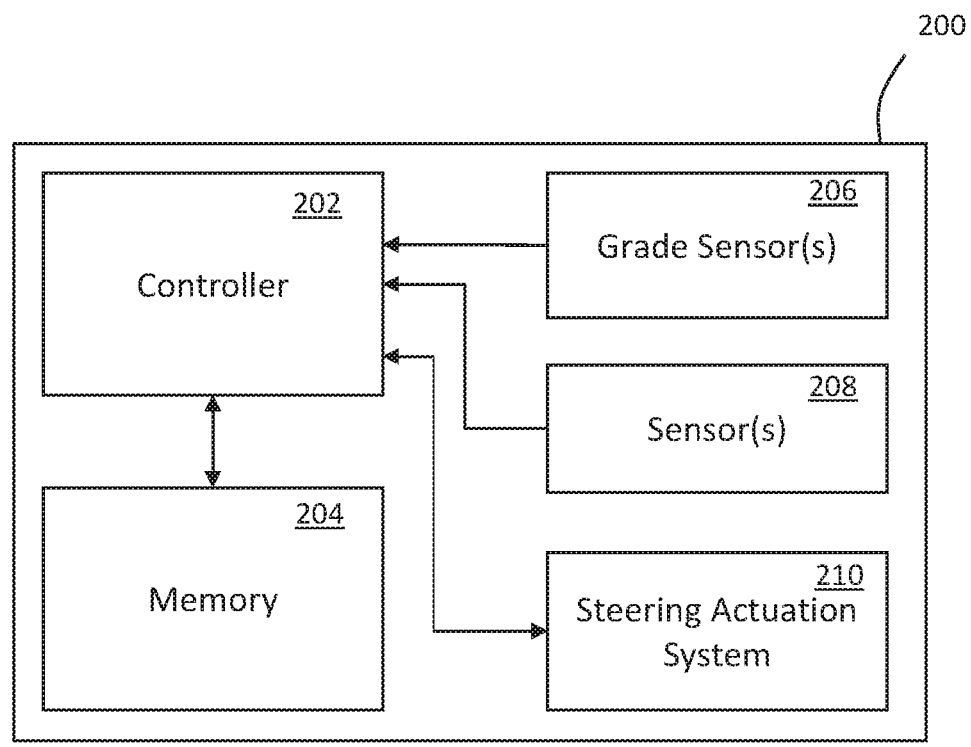
FIG. 2 is a block diagram illustrating an example control system for a working machine.

FIG. 2 is a block diagram illustrating an example control system 200 for machine 100. Control system 200 includes controller 202, memory 204, grade sensor(s) 206, sensor(s) 208, and steering actuation system 210. Control system 200 can include any additional hardware and/or software based on the needs of the specific working machine. For example, control system 200 may include, among other things, implement actuators configured to control movement of implements included on the working machine.

While illustrated as a single generic controller 202, control system 200 may include any number of separate electronic control units. For example, control system 200 may include an engine control unit, an implement control unit, a transmission control unit, a brake control unit, and a control unit for steering actuation system 210, for example. The actual implementation of the control units depends on the configuration of machine 100. Each of the control units (represented together as generic controller 202), can include software, hardware, and combinations of hardware and software configured to execute functions attributed to machine 100. Controller 202 can include integrated circuit boards or ICB(s), printed circuit boards PCB(s), processor(s), data storage devices, switches, relays, or any other circuitry. Examples of processors can include any one or more of a microprocessor, a digital signal processor (DSP), an application specific integrated circuit (ASIC), a field-programmable gate array (FPGA), or equivalent discrete or integrated logic circuitry.

Memory 204 can be any volatile memory, non-volatile memory, or combination thereof. Memory 204 may be encoded with instructions that when executed by controller 202 causes controller 202 to control steering actuation system 204 to control a turn radius of machine 100 and provide other control for machine 100. Memory 204 may also store attributes of machine 100. For example, the attributes may include a stationary center of gravity location, weight, and other attributes of machine 100. While illustrated as a single memory 204, control system 200 can include any number of memories. For example, each control unit may include one or more dedicated volatile and/or non-volatile memories. Examples of non-volatile storage devices include magnetic hard discs, optical discs, floppy discs, flash memories, or forms of electrically programmable memories (EPROM) or electrically erasable and programmable (EEPROM) memories. Examples of volatile storage devices include random access memories (RAM), dynamic random access memories (DRAM), static random access memories (SRAM), and other forms of volatile storage devices.

Grade sensor(s) 206 measure the grade or angle (e.g., relative to ground/horizontal) at which machine 100 is disposed. Grade sensor(s) 206 can include several different types of sensors, including, for example, accelerometers, inclinometers, tilt sensors, or other sensors for determining incline, decline, change in elevation, slope, orientation, or grade of machine 100. Grade sensor(s) 206 can also include a global positioning system, an external input regarding the grade of machine 100 at the current position of the machine, or an input from another source.

Sensor(s) 208 are any other sensors located on machine 100, and are configured to sense values indicative of any environment in which machine 100 is operating. Sensor(s) 208 may include, among others, load sensors and speed sensors, for example. The speed sensor may be any sensor capable of sensing a speed at which machine 100 is moving. The load sensor may be configured to sense a load of machine 100. The load of machine 100 can include the weight of the machine and the load or weight of an external load on the machine.

Controller 202 can be configured to communicate with other components of control system 200 and machine 100 via various wired or wireless communications technologies and components using various public and/or proprietary standards and/or protocols. Examples of transport mediums and protocols for electronic communication between components of machine 100 include Ethernet, Transmission Control Protocol/Internet Protocol (TCP/IP), 802.11 or Bluetooth, or other standard or proprietary transport mediums and communication protocols.

Steering control system 210 can include various mechanisms and devices not specifically shown but known in the art. For example, steering control system 210 can include a friction device in communication with the controller 202 and configured to create resistance to movement by the operator of a steering wheel. Friction devices are well known in the art and can create resistance mechanically, electrically, by use of a variable viscosity fluid, or the like. Similarly, steering control system 210 can include a steering control valve in communication with controller 202. The steering control valve can be configured to receive processed steering input from controller 202 and, based on that input, steer machine 100 by controlling movement of the wheels.

Steering control system 210 can also be configured to receive operator steering input. In some examples, steering control system 210 can alternatively or additionally be configured to control steering automatically by controller 202. In some examples, steering control system 210 can be configured to transmit the operator steering input to controller 202 for processing. Steering control system 210 can also provide feedback to controller 202 indicative of a present direction of steering of machine 100.

Figure 3A:
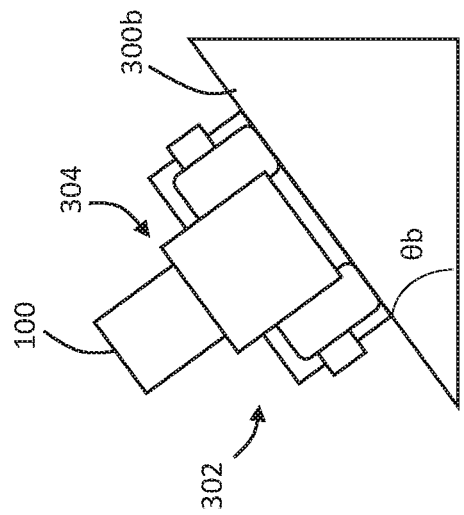
FIGS. 3A and 3B are rear views of a working machine traversing hills of differing slope.
Figure 3B:
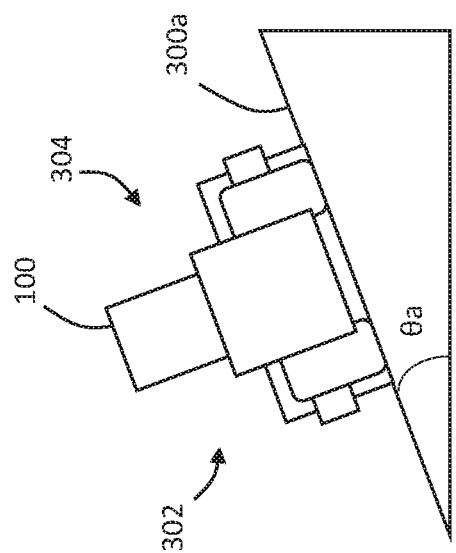

FIGS. 3A and 3B illustrate two example hills 300a and 300b having different respective angles of slope θa and θb. In FIG. 3A, machine 100 is traversing hill 300a, which has an angle of slope of θa, and in FIG. 3B, machine 100 is traversing hill 300b, which has an angle of slope of θb, which is greater than θa. In one example, hill 300a may have an angle of slope θa of 20 degrees, while hill 300b may have an angle of slope θb of 40 degrees.

While traversing hills 300a and 300b, grade sensor(s) 206 may be configured to sense values indicative of a slope of machine 100 from downhill machine side 302 to uphill machine side 304. This value may be utilized by controller 202 to determine a slope of the respective hill 300a and 300b upon which machine 100 is traversing. Controller 202 can use the determined slope, as well as other properties of machine 100, such as speed, center of gravity location, and steering direction, to provide control for steering actuation system 210.

In one example embodiment, controller 202 may implement two threshold slope values. These threshold slope values may be set based on, among other things, attributes of machine 100. For example, the first threshold slope may be the slope at which controller 202 will provide input to steering control system 210 to begin limiting an uphill (toward uphill machine side 304) turn radius of machine 100. This value can be based on properties of machine 100 such as size, weight, center of gravity, whether machine 100 is an articulated type machine, an absolute minimum turn radius of machine 100, and other properties of machine 100. The threshold slope values can be dynamic such that controller 202 continuously updates the threshold values based on present conditions.

A second threshold slope value may also be set based on properties of machine 100 and may be a value of slope for which it is desirable to completely prevent any uphill turning of machine 100. For slopes that fall between the first and second threshold slope values, controller 202 may control steering actuation system 210 to increase a minimum inside turn radius of machine 100. In one example embodiment, controller 202 may set an adjusted minimum turn radius of machine 100 linearly between the absolute minimum turn radius of machine 100, and a maximum desired turn radius of machine 100. The maximum desired turn radius may be any uphill turn radius desirable prior to complete prevention of uphill turning of machine 100. In some embodiments, control system 200 can provide similar steering control for downhill turns. In other example embodiments, control system 200 may not provide any limit to downhill turning of machine 100, regardless of slope.

FIGS. 4A and 4B illustrate two example turn radii for machine 100. FIG. 4A illustrates an example absolute minimum turn radius 400a for machine 100. In one example embodiment, machine 100 is a vibratory soil compactor with an absolute minimum inside turn radius of 3.05 meters. Other machines, including articulated-type machines, can have a larger or smaller absolute minimum inside turning radius based on the capabilities of the machine. FIG. 4B illustrates an example maximum turning radius 400b that may be used for machine 100 prior to preventing all uphill turning of machine 100.

Once controller 202 detects a slope greater than the first threshold slope value, controller 202 can control steering actuation system 210 to increase the minimum turn radius of machine 100 between, for example, absolute minimum turn radius 400a and maximum turn radius 400b. For angles of slope less than θa, controller 202 may allow machine 100 to turn uphill at any turn radius, including the minimum turn radius 400a, as illustrated in FIG. 4A. Once controller 202 determines a slope greater than θb, controller 202 can control steering actuation system 210 to completely prevent uphill turning of machine 100.

Figure 5:
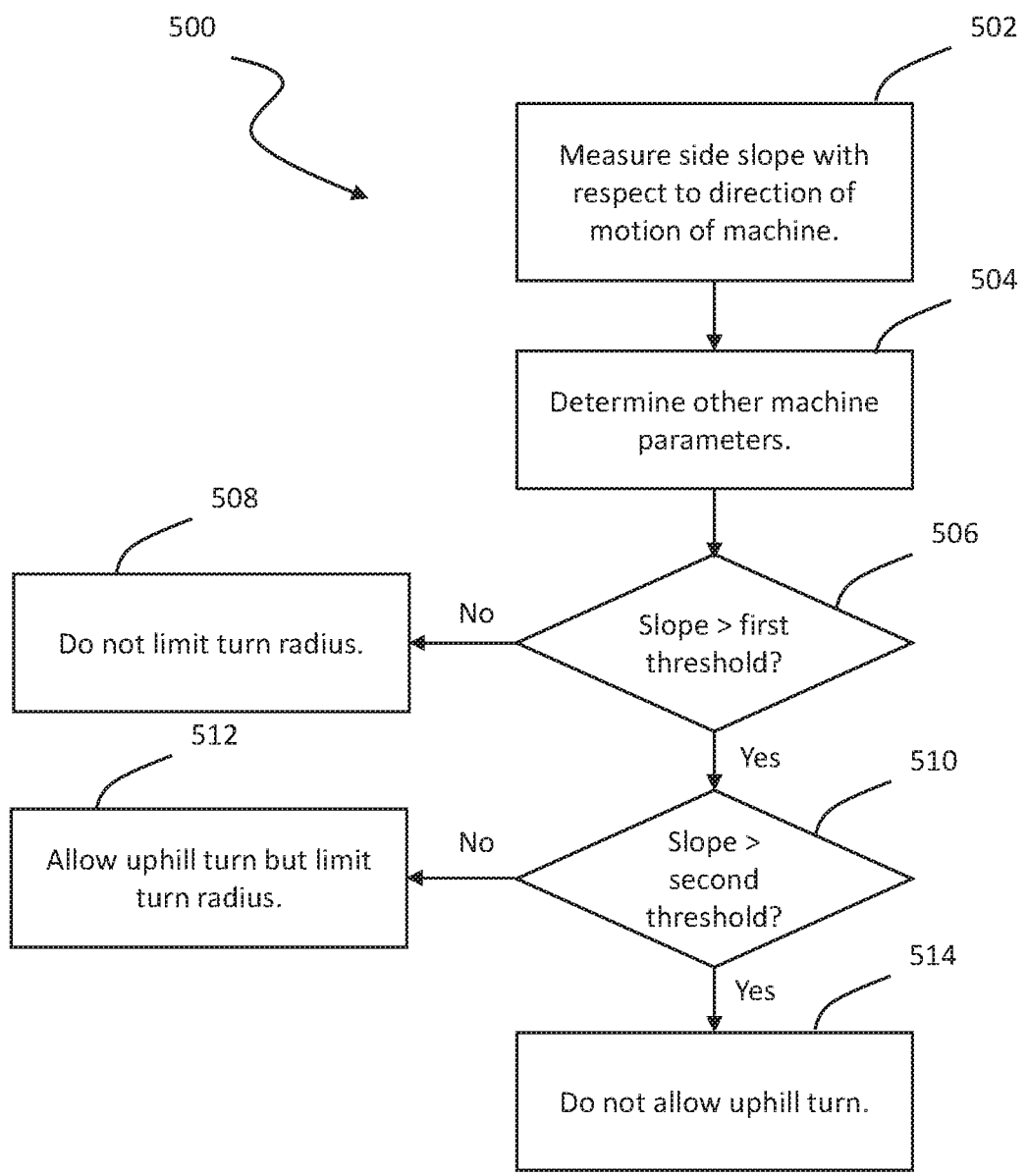
FIG. 5 is a flowchart illustrating a method of controlling a turn radius of a working machine based on a determined slope of a hill.

FIG. 5 is a flowchart illustrating method 500 of controlling a turn radius of a working machine traversing a side hill. At step 502, a control system of the working machine determines a slope of the hill from an uphill side of the working machine to a downhill side. At step 504, other machine parameters are considered by the control system including, but not limited to, speed, a center of gravity, and steering direction of the working machine. The machine parameters may be used to set first and second slope thresholds for the working machine.

The measured slope is compared to the first threshold at step 506. If the measured slope is greater than the first threshold, method 500 proceeds to step 510. If the measured slope is less than the first threshold, method 500 proceeds to step 508 and the control system does not limit the turning radius of the working machine in any way.

The measured slope is compared to the second threshold at step 510. If the measured slope is greater than the second threshold, method 500 proceeds to step 514 and the control system completely prevents the working machine from turning uphill. If the measured slope is less than the second threshold, method 500 proceeds to step 512 and the control system permits uphill turning, but limits the turn radius of the working machine. The turn radius may be limited as a function of the measured slope, the center of gravity of the working machine, the speed of the working machine, and any other properties of the working machine that may contribute to tipping of the working machine during uphill turns.

INDUSTRIAL APPLICABILITY

Example machines in accordance with this disclosure can be used in a variety of industrial, construction, commercial or other applications. As the machine moves from various locations, the machine may be required to traverse various grades including side slopes. Due to center of gravity shifts associated with articulated type machines, or lateral forces associated with all types of machines, tipping can he of concern while turning uphill. It is desirable automatically control steering of working machines traversing side slopes to prevent tipping of the machine.

The machine can therefore include a control system that is configured to automatically determine a slope of the hill upon which the machine is traversing and limit a turn radius of the machine based on the determined slope. In one example, a CS44B vibratory soil compactor is operating on a side slope. A grade sensor of the soil compactor is configured to sense an orientation of the machine to determine a slope of the hill from an uphill side of the machine to a downhill side of the machine.

In this example, the vibratory soil compactor can have a tip over angle of approximately 45 degrees and an absolute minimum turning radius of 3.05 meters. The first threshold value may be set to 20 degrees such that the control system of the soil compactor begins limiting the turn radius of the soil compactor when the determined side slope is greater than 20 degrees. The second threshold value may be set to 40 degrees such that the control system completely prevents uphill turning of the soil compactor when the determined slope is greater than 40 degrees.

Automatic control of steering based on determined slope provides significant advantages. Compactors and other machines operate on varying terrain. By automatically controlling steering based on slope, human error can be reduced, and machines can be operated with decreased concern for tipping of the machine, increasing the longevity of the machines.

The above detailed description is intended to be illustrative, and not restrictive. The scope of the disclosure should, therefore, be determined with references to the appended claims, along with the full scope of equivalents to which such claims are entitled.

What is claimed is:

1. A machine comprising:
    a steering system configured to direct movement of the machine; and
    a control system operably coupled for communication with the steering system, the control system comprising:
    a grade sensor; and
    a controller configured to determine a slope laterally across the machine from an uphill side of the machine to a downhill side of the machine based on sensed data from the grade sensor, wherein the controller is further configured to control the steering system to limit a turn radius of the machine toward the uphill side of the machine based on the determined slope;
    wherein the control system is configured to limit the turn radius of the machine toward the uphill side if the slope is greater than a first threshold value;
    and wherein the control system is configured to prevent any turning of the machine toward the uphill side if the slope is greater than a second threshold value, wherein the second threshold value is greater than the first threshold value.

2. The machine of claim 1, wherein the control system is configured to limit the turn radius by increasing a minimum turn radius of the machine toward the uphill side if the slope is between the first threshold and the second threshold.

3. The machine of claim 1, wherein the control system does not limit the turn radius of the machine toward the downhill side of the machine.

4. The machine of claim 1, wherein the control system further comprises a memory configured to store attributes of the machine including a stationary center of gravity of the machine.

5. The machine of claim 4, wherein the control system is further configured to control the steering system to limit the turn radius of the machine toward the uphill side based further on one or more attributes of the machine.

6. The machine of claim 1, wherein the machine is a soil compactor.

7. A method of controlling a working machine traversing a hill, the method comprising:
    determining, by the working machine, a slope of the hill laterally across the working machine from an uphill side of the working machine to a downhill side of the working machine;
    comparing, by a control system of the working machine, the slope to first threshold;
    limiting, by the control system, an uphill turn radius of the working machine if the slope is greater than the first threshold;
    comparing, by the control system, the slope to a second threshold, greater than the first threshold; and
    preventing, by the control system, any uphill turning of the working machine if the slope is greater than the second threshold.

8. The method of claim 7, wherein limiting, by the control system, the uphill turn radius of the working machine if the slope is greater than the first threshold comprises:
adjusting, by the control system, a minimum turn radius of the working machine when the slope is between the first threshold and the second threshold.

9. The method of claim 8, wherein adjusting, by the control system, the minimum turn radius of the working machine when the slope is between the first threshold and the second threshold further comprises adjusting the minimum turn radius based further upon attributes of the working machine stored in a memory of the control system.

10. The method of claim 9, wherein the attributes of the working machine include a center of gravity of the working machine and a speed of the working machine.

11. The method of claim 7, wherein the first threshold is set as a 20 degree angle of slope, and the second threshold is set as a 40 degree angle of slope.

12. A control system for a working machine, the control system comprising:
a grade sensor configured to sense a value indicative of a slope of a hill upon which the working machine is traversing;
a steering system configured to control a direction of movement of the working machine;
a controller configured to determine the slope of the hill laterally across the working machine from an uphill side of the working machine to a downhill side of the working machine based on input from the grade sensor and control the steering system to limit an uphill turn radius of the working machine based on the slope;
a memory, wherein the memory is configured to store properties of the working machine, and wherein the controller is further configured to control the steering system to limit the uphill turn radius of the working machine based further upon the properties of the working machine that include a center of gravity of the working machine;
wherein the controller limits the uphill turn radius of the working machine if the slope is greater than a first threshold value; and
wherein the controller prevents any uphill turn radius of the working machine if the slope is greater than a second threshold value, wherein the second threshold value is greater than the first threshold value.

13. The control system of claim 12, wherein the controller is configured not to limit downhill turning of the working machine based on the slope.

* * * * *